Patented Feb. 13, 1934

1,946,829

UNITED STATES PATENT OFFICE 1,946,829

BENZANTHRONE-1-ALDEHYDE AND PROCESS OF MAKING SAME

Otto Bayer, Frankfort-on-the-Main, Germany, assignor to General Aniline Works, Inc., New York, N. Y., a corporation of Delaware No Drawing. Application April 5, 1933, Serial No. 664,667, and in Germany April 15, 1932

6 Claims. (Cl. 260—61)

This invention relates to benzanthrone-1-aldehydes and process of making same.

The process of manufacture in accordance with the invention comprises treating bz-1-(ω-phthalimino-methyl)-benzanthrone which may contain a halogen atom in 6-position of the benzanthrone nucleus with an oxidizing agent in the presence of aqueous alkali. Under the influence of the alkali as intermediate the phthalaminic acid of bz-1-(ω-amino-methyl)-benzanthrone is formed which is easily transformed by the action of the oxidizing agent into the aldehyde with splitting off of phthalic acid and ammonia.

The process runs according to the following formulæ:

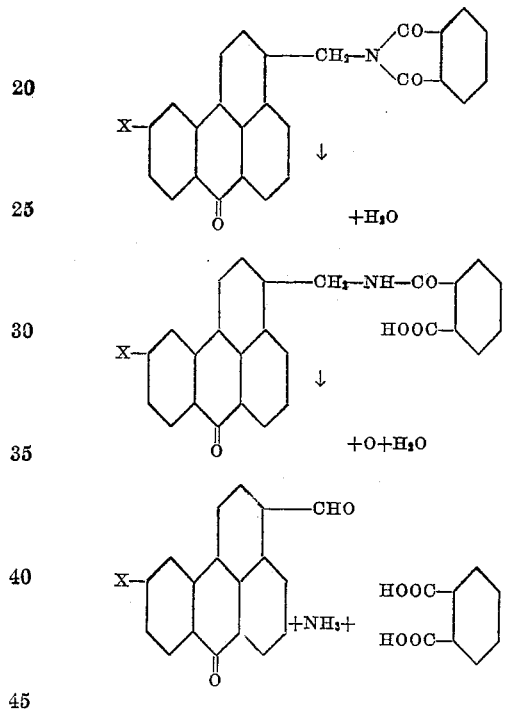

wherein X means hydrogen or halogen.

The starting material for the present process i. e. the bz-1-(ω-phthalimino-methyl)-benzanthrone is obtainable by condensing benzanthrone or its 6-halogen-derivatives with chloro-methyl-phthalimide, for example by heating the components in the presence of nitrobenzene and zinc chloride for some hours at temperatures of 130 to 150° C.

The present alkaline oxidation process is advantageously carried out by using the air as oxidizing agent. But other oxidizing agents such as for example hypochlorites, potassium ferricyanide or hydrogen peroxide are also suitable. The addition of a catalyst such as ferric hydroxide has been proved advantageous in some cases.

Since in the present process the phthalaminic acid is formed as intermediate this acid may previously be prepared according to any known method and then converted according to the present process into the bz-1-benzanthrone-aldehydes.

The bz-1-benzanthrone-aldehyde and its 6-halogen-derivatives which are easily accessible according to the present process are important intermediates for the production of dyestuffs.

In order to further illustrate my invention the following examples are given, the parts being by weight and all temperatures in centigrade degrees; but it is, however, to be understood that my invention is not limited to the particular products nor reacting conditions mentioned therein.

Example 1

To 10 parts of bz-1-(ω-phthalimino-methyl)-benzanthrone (FP 288°), 40 parts of a caustic soda lye of 33° Bé. and about 300 parts of water are added and in a suitable vessel at 90-100° air is introduced while stirring intensely. The formation of the phthalaminic acid is shown by a yellow coloration of the reaction mass and then the precipitation of the new aldehyde begins. After about 3 to 5 hours the oxidation process is complete and the aldehyde compound is filtered off and washed.

The new bz-1-benzanthrone-aldehyde thus produced is readily soluble in hot nitrobenzene and moderately soluble in boiling glacial acetic acid. It forms light yellowish crystals of melting point about 224°. It dissolves in sulfuric acid with a yellowish orange color and its hydrazone with an intense carmine red color. The aldehyde forms with an alkaline hydrosulfite solution a reddish blue vat. When treated with chromic acid with the addition of glacial acetic acid it yields the benzanthrone-bz-1-carboxylic acid which is known in literature.

The oxidation may be accelerated by the addition of about 0.1 part of water-dissolved ferrous sulfate. Also when working in an autoclave with oxygen under pressure the duration of the reaction is considerably diminished.

By starting in the above example from the equivalent amount of the phthalaminic acid of bz-1-(ω-amino-methyl)-benzanthrone and working in the same manner, the bz-1-benzanthrone-aldehyde is likewise obtained in a smooth reaction.

*Example 2*

20 parts of 6-chloro-bz-1-(ω-phthalimino-methyl)-benzanthrone are heated to boiling for about 6 hours in about 600 parts of water and about 100 parts of a caustic soda lye of 33° Bé. while air is introduced. The mass is worked up as described in the foregoing example. The 6-chloro-bz-1-benzanthrone-aldehyde thus obtained crystallizes from glacial acetic acid, wherein it is difficulty soluble even in the hot, in pale yellow needles. It melts at 290° and forms a bluish green vat.

By oxidizing instead of with air with for example about 50 parts of a solution of sodium hypochlorite (containing 13% of active chlorine) likewise the aldehyde is obtained.

In the same manner from the bz-1-(ω-phthal-imino-methyl)-derivative of the 6-bromo-benzanthrone the 6-bromo-bz-1-benzanthrone-aldehyde may be obtained.

I claim:

1. Process for the production of benzanthrone-bz-1-aldehyde which may contain a halogen-atom in 6-position which comprises treating bz-1-(ω-phthalimino-methyl)-benzanthrone which may contain a halogen atom in 6-position of the benzanthrone nucleus and which corresponds to the formula:

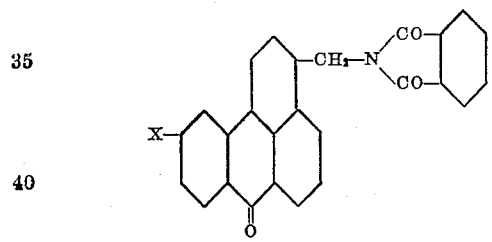

wherein X means hydrogen or halogen, with an oxidizing agent in the presence of caustic alkali.

2. Process for the production of benzanthrone-bz-1-aldehyde which may contain a halogen-atom in 6-position which comprises treating bz-1-(ω-phthalimino-methyl)-benzanthrone which may contain a halogen-atom in 6-position of the benzanthrone nucleus and which corresponds to the formula:

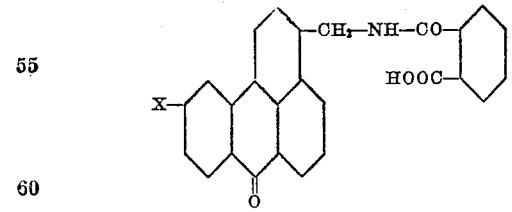

wherein X means hydrogen or halogen, with air in the presence of caustic alkali.

3. In the process for the production of benzanthrone-bz-1-aldehyde which may contain a halogen atom in 6-position the step which comprises treating benzanthrone-bz-1-methyl-ω-phthalaminic acid which may contain a halogen atom in 6-position of the benzanthrone nucleus and which corresponds to the formula

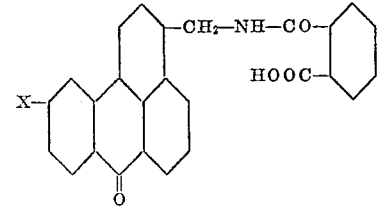

wherein X means hydrogen or halogen, with an oxidizing agent in the presence of caustic alkali.

4. The benzanthrone-bz-1-aldehydes which may contain in 6-position a halogen atom and which correspond to the formula

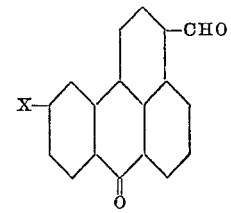

wherein X means hydrogen or halogen, said compounds representing yellowish crystals having a definite melting point, forming intensely colored vats.

5. The benzanthrone-bz-1-aldehyde of the formula

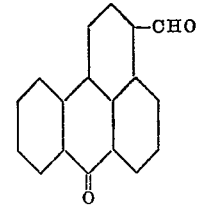

said compound representing light yellowish crystals melting at 224° C. forming a reddish blue vat.

6. The 6-chloro-benzanthrone-bz-1-aldehyde of the formula

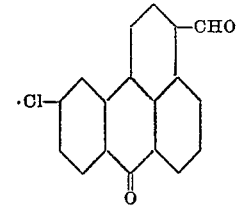

said compound representing pale yellowish crystals melting at 290° C. forming a bluish green vat.

OTTO BAYER.